US012559239B2

(12) United States Patent
Kodati et al.

(10) Patent No.: US 12,559,239 B2
(45) Date of Patent: Feb. 24, 2026

(54) INTEGRATED SEAT ASSEMBLY WITH HEADREST AND NECK SUPPORT

(71) Applicant: B/E Aerospace, Inc., Winston-Salem, NC (US)

(72) Inventors: Sambasiva Rao Kodati, Vinjaram (IN); Chandra Sekhar Gudla, Hyderabad (IN); Guruswamy Prasad Gundra, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 164 days.

(21) Appl. No.: 18/615,117

(22) Filed: Mar. 25, 2024

(65) Prior Publication Data

US 2024/0425182 A1    Dec. 26, 2024

(30) Foreign Application Priority Data

Jun. 23, 2023    (IN) .............................. 202311041897

(51) Int. Cl.
B64D 11/06        (2006.01)
(52) U.S. Cl.
CPC ............................... B64D 11/0642 (2014.12)
(58) Field of Classification Search
CPC ..... B64D 11/0642; B60N 2/809; B60N 2/885
See application file for complete search history.

(56) References Cited

U.S. PATENT DOCUMENTS

| | | | |
|---|---|---|---|
| 6,616,235 B1 | 9/2003 | Khavari et al. | |
| 7,201,448 B2 | 4/2007 | Williamson et al. | |
| 10,202,196 B2 | 2/2019 | Hontz et al. | |
| 10,807,719 B2 * | 10/2020 | Wanner ............. | B64D 11/0642 |
| 11,518,285 B2 | 12/2022 | Carles et al. | |
| 2004/0007910 A1 * | 1/2004 | Skelly ................... | B64D 11/06 |
| | | | 297/284.3 |
| 2006/0202522 A1 | 9/2006 | Lee | |
| 2019/0160984 A1 | 5/2019 | Hickman Guevara et al. | |
| 2019/0223602 A1 | 7/2019 | Radke | |
| 2021/0178948 A1 | 6/2021 | Clough et al. | |

FOREIGN PATENT DOCUMENTS

DE        102005030258 A1    1/2007

OTHER PUBLICATIONS

European Patent Office, Extended European Search Report received in EP Application No. 24182093.5, Oct. 25, 2024, 6 pages.

* cited by examiner

*Primary Examiner* — Nicholas McFall
(74) *Attorney, Agent, or Firm* — Suiter Swantz IP

(57) ABSTRACT

An integrated seat assembly including a fixed subassembly attachable to a seat backrest, a headrest subassembly configured to translate along a rail of the fixed subassembly, and a neck support subassembly also configured to translate along the rail, independently of the translation of the headrest subassembly. Each of the headrest subassembly and the neck support subassembly include articulating supports configured to enhance support of comfort of the respective subassemblies. Each of the headrest subassembly and the neck support subassembly may include a cushion for further comfort.

18 Claims, 10 Drawing Sheets

104

104

INTEGRATED SEAT ASSEMBLY WITH HEADREST AND NECK SUPPORT

CROSS-REFERENCE AND INCORPORATION BY REFERENCE

This nonprovisional patent application claims priority to Indian patent application No. 202311041897 filed Jun. 23, 2023 for INTEGRATED SEAT ASSEMBLY WITH HEADREST AND NECK SUPPORT, which is hereby incorporated by reference in its entirety.

TECHNICAL FIELD AND BACKGROUND

The present disclosure relates generally to passenger seat comfort and support, and more particularly, to an integrated seat assembly including an adjustable headrest subassembly and an independently adjustable neck support subassembly, each of which further include articulating supports.

Seats such as aircraft passenger seats are designed for safety and comfort. Safety typically pertains to the seat frame construction and material performance, while comfort typically pertains to the seat adjustability, ergonomics, cushioning, and climatization.

Headrests are one example of a seat element that provides both comfort and support. For example, a seat may include a separate headrest that serves to center the head with respect to the backrest, provide additional cushioning, and in some cases include a provision for sleeping. While some headrests may be adjustable depending on the user and user preference, adjustability is typically limited to height and/or tilt. In addition, conventional headrests do not offer similar comfort and support to the neck. As such, passengers requiring neck support, particularly in airliners, are required to supply their own neck pillow which can be cumbersome to carry, forgotten when deplaning, and does not comply with FAA flammability performance requirements.

Therefore, what is needed is an integrated seat element that provides both head and neck support with separate adjustment capabilities to accommodate various users and user preferences.

BRIEF SUMMARY

In one aspect, embodiments of the inventive concepts disclosed herein are directed to an integrated seat assembly. In embodiments, the integrated seat assembly includes a fixed subassembly attachable to a seat backrest, the fixed subassembly including a rail, a headrest subassembly configured to translate along the rail, and a neck support subassembly configured to also translate along the rail, independent of the translation of the headrest subassembly. In embodiments, the headrest subassembly includes a headrest support plate, a left headrest support rotatably attached to the headrest support plate, and a right headrest support rotatably attached to the headrest support plate. In embodiments, the neck support subassembly includes a neck support plate, a left neck support attached to the neck support plate, and a right neck support attached to the neck support plate.

In some embodiments, each of the left neck support and the right neck support include a plurality of rotatably connected individual segments.

In some embodiments, each of the left neck support and the right neck support are fully articulating gooseneck supports.

In some embodiments, each of the left headrest support, the right headrest support, the left neck support, and the right neck support are configured to deploy, independently, in a forward direction away from the fixed subassembly.

In some embodiments, each of the headrest support plate, the left headrest support, the right headrest support, the neck support plate, the left neck support, and the right neck support carry a cushion.

In some embodiments, each of the headrest subassembly and the neck support subassembly further include a cushion, the cushion of the headrest subassembly is continuous across the left headrest support, the headrest support plate, and the right headrest support, and the cushion of the neck support subassembly is continuous across the left neck support, the neck support plate, and the right neck support.

In some embodiments, the headrest subassembly and the fixed subassembly interface through a first set of rollers, and the neck support subassembly and the fixed subassembly interface through a second set of rollers.

In some embodiments, at least one of the headrest subassembly and the neck support subassembly further includes a speaker.

In some embodiments, at least one of the headrest subassembly and the neck support subassembly further includes at least one of a massager, a fan, and a heater.

In another aspect, embodiments of the inventive concepts disclosed herein are further directed to an aircraft passenger seat including a backrest and an integrated assembly. The integrated assembly includes a fixed subassembly attached to a front of the backrest, the fixed subassembly including a rail, a headrest subassembly configured to translate along the rail, and a neck support subassembly configured to also translate along the rail, independent of the translation of the headrest subassembly. In embodiments, the headrest subassembly includes a headrest support plate, a left headrest support rotatably attached to the headrest support plate, and a right headrest support rotatably attached to the headrest support plate. In embodiments, the neck support subassembly includes a neck support plate, a left neck support attached to the neck support plate, and a right neck support attached to the neck support plate.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
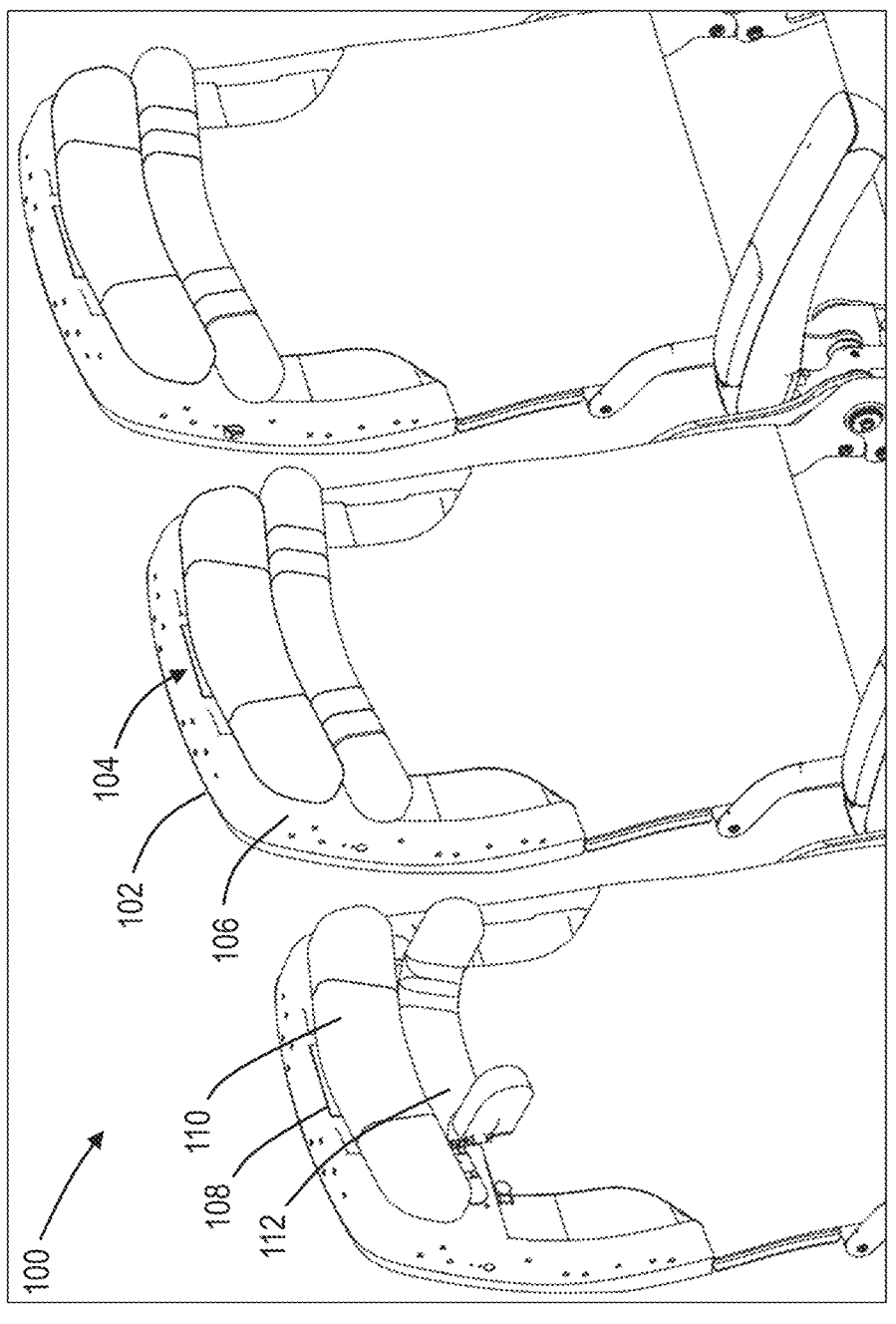
FIG. 1 illustrates a seat row wherein each seat is equipped with an integrated seat assembly, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to comfort and support features for seats such as economy and premium class airliner passenger seats. In embodiments, the assemblies described herein provide both head and neck comfort and support by way of independently adjustable subassemblies. In embodiments, each subassembly is fully adjustable, as well as adjustable relative to the other subassembly, such that the adjustment capabilities of the assembly are vast to accommodate virtually any user and user preference. In addition to supporting the head and neck during movement of the vehicle, the assemblies include provisions for sleeping and can serve as a location for optional features such as speakers, massagers, fans, heaters, etc.

FIG. 1 illustrates a non-limiting example of an economy class passenger seat row 100 including passenger seats 102 each equipped with an integrated seat assembly 104 according to embodiments of the present disclosure. Each passenger seat 102, or "seat 102," generally includes a backrest 106 as well as additional elements such as a seat pan, armrests, etc. (not shown), and not critical to the present disclosure. The frontside of each backrest 106 serves as the mounting location for the integrated seat assembly 104, also referred to herein as "the assembly 104." Each assembly 104 includes a plurality of subassemblies, and more particularly, a fixed subassembly 108, a headrest subassembly 110, and a neck support subassembly 112, each of which are described in detail below. FIG. 1 shows three seats forming the seat row 100, wherein the "left" seat 102 shows both the "left" and "right" sides of the neck support subassembly 112 articulated forward.

Figure 2:
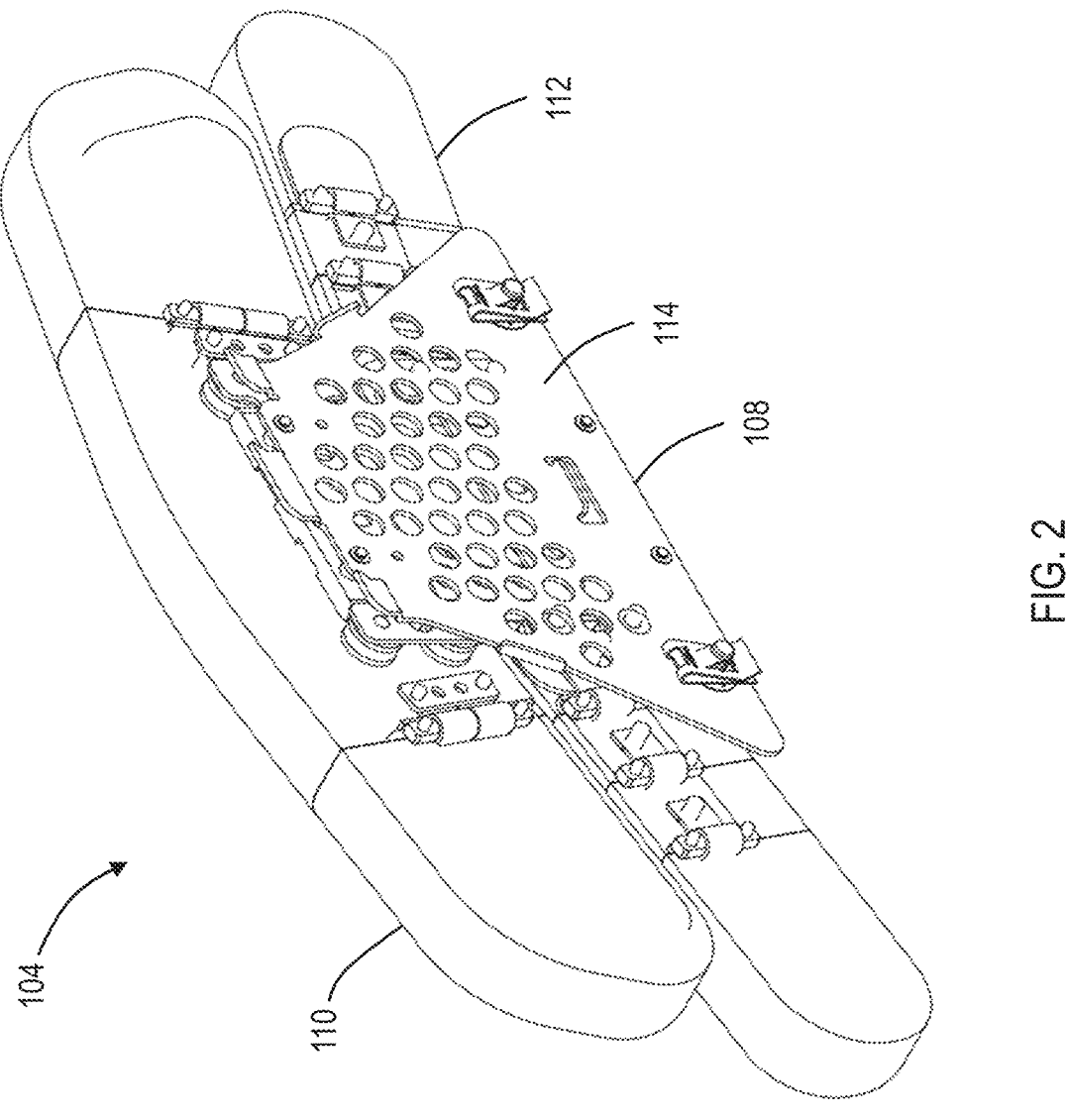
FIG. 2 is an isometric view of the integrated seat assembly showing the subassemblies, in accordance with example embodiments of this disclosure.

FIG. 2 illustrates the back of the assembly 104 and shown detached from a seat. The fixed subassembly 108 includes a support plate 114 attachable to support structure of a seat backrest. In some embodiments, the support plate 114 may be rigid, made of metal, and foraminous to save weight. The support plate 114 is attachable to a seat backrest using any suitable fasteners, bracketry, etc. In some embodiments, the support plate 114 may form a further part of the backrest. The headrest subassembly 110 is movably attached to the fixed subassembly 108 to permit vertical adjustment of the headrest subassembly 110. The neck support subassembly 112 is also movably attached to the fixed subassembly 108 to permit vertical adjustment of the neck support subassembly 112. Vertical adjustment as used herein means up and down motion not necessarily along a vertical axis considering the adjustable nature of the backrest. Each of the headrest subassembly 110 and the neck support subassembly 112 are independently adjustable, such as manually adjustable, such that both subassemblies can be adjusted up relative to the fixed subassembly 108, down relative to the fixed subassembly 108, closer together, and further spaced apart.

As shown in FIG. 2, each of the headrest subassembly 110 and the neck support subassembly 112 are shown in their retracted, stowed, or otherwise undeployed configuration. In some embodiments, the condition shown may correspond to a taxi, takeoff and landing (TTOL) configuration in which each of the headrest subassembly 110 and the neck support subassembly are articulated substantially planar. In some embodiments, the joints connecting the subassembly components may be configured to prevent rearward movement of the side support members beyond the positions shown in FIG. 2. As such, manually returning the side supports to their fully stowed state results in the configuration shown in FIG. 2.

Figure 3:
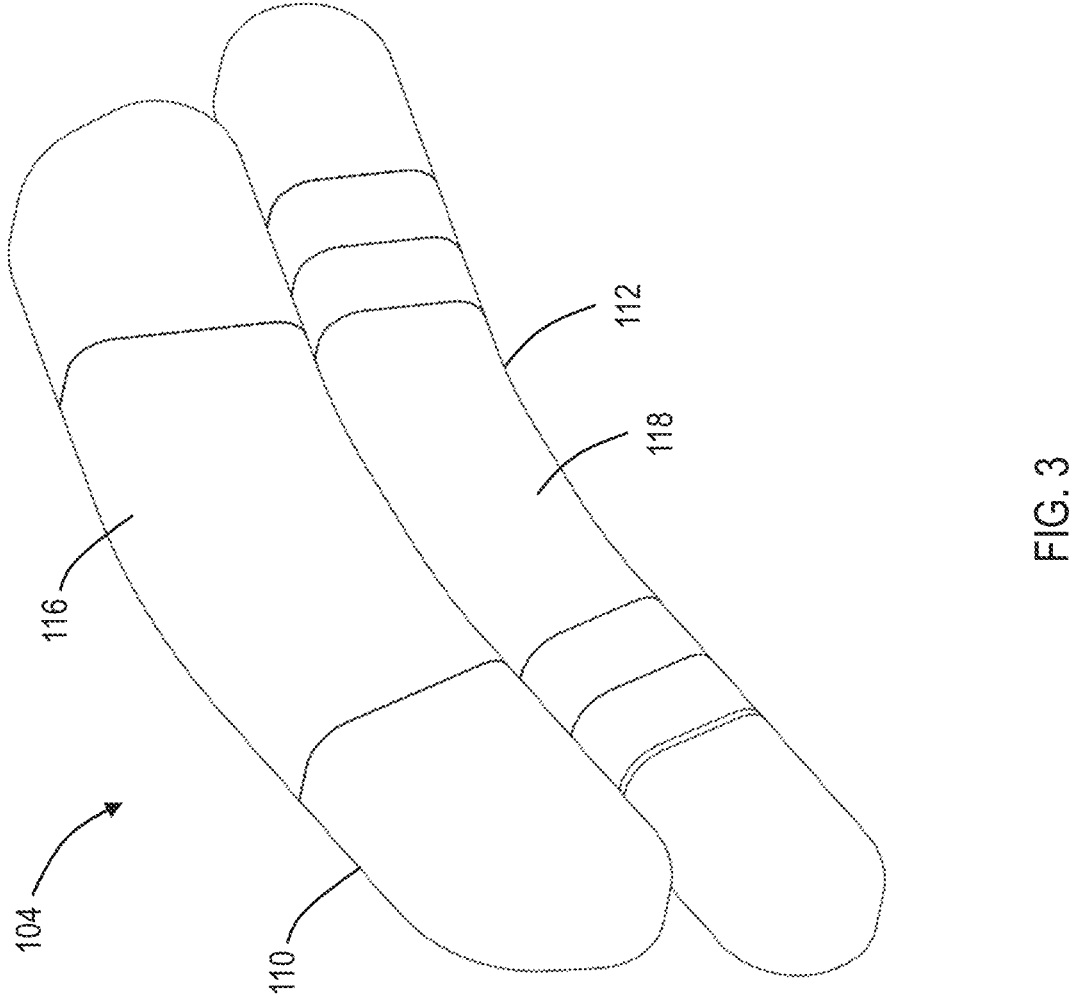
FIG. 3 is an isometric view of the integrated seat assembly showing the front cushions, in accordance with example embodiments of this disclosure.

FIG. 3 illustrates the front of the assembly 104 for positioning in direct contact with the user. The headrest subassembly 110 includes a headrest cushion 116. In some embodiments, the headrest cushion 116 may be continuous across the length of the headrest subassembly 110. In other embodiments, the headrest cushion 116 may include a plurality of separate cushion segments wherein the breaks between cushion segments align with the joints to facilitate articulation of the headrest segments. The neck support subassembly 112 also includes a neck support cushion 118. In some embodiments, the neck support cushion 118 may be continuous across the length of the neck support subassembly 112. In other embodiments, the neck support cushion 118 may include a plurality of separate cushion segments wherein the breaks between cushion segments align with the joints to facilitate articulation of the neck support segments. Each of the headrest subassembly 110 and the neck support subassembly 112 may include any number and type of cushions, and may further include a dress cover in some embodiments. Cushion and dress cover materials may be performance based to satisfy requirements for materials used in aircraft.

Figure 4:
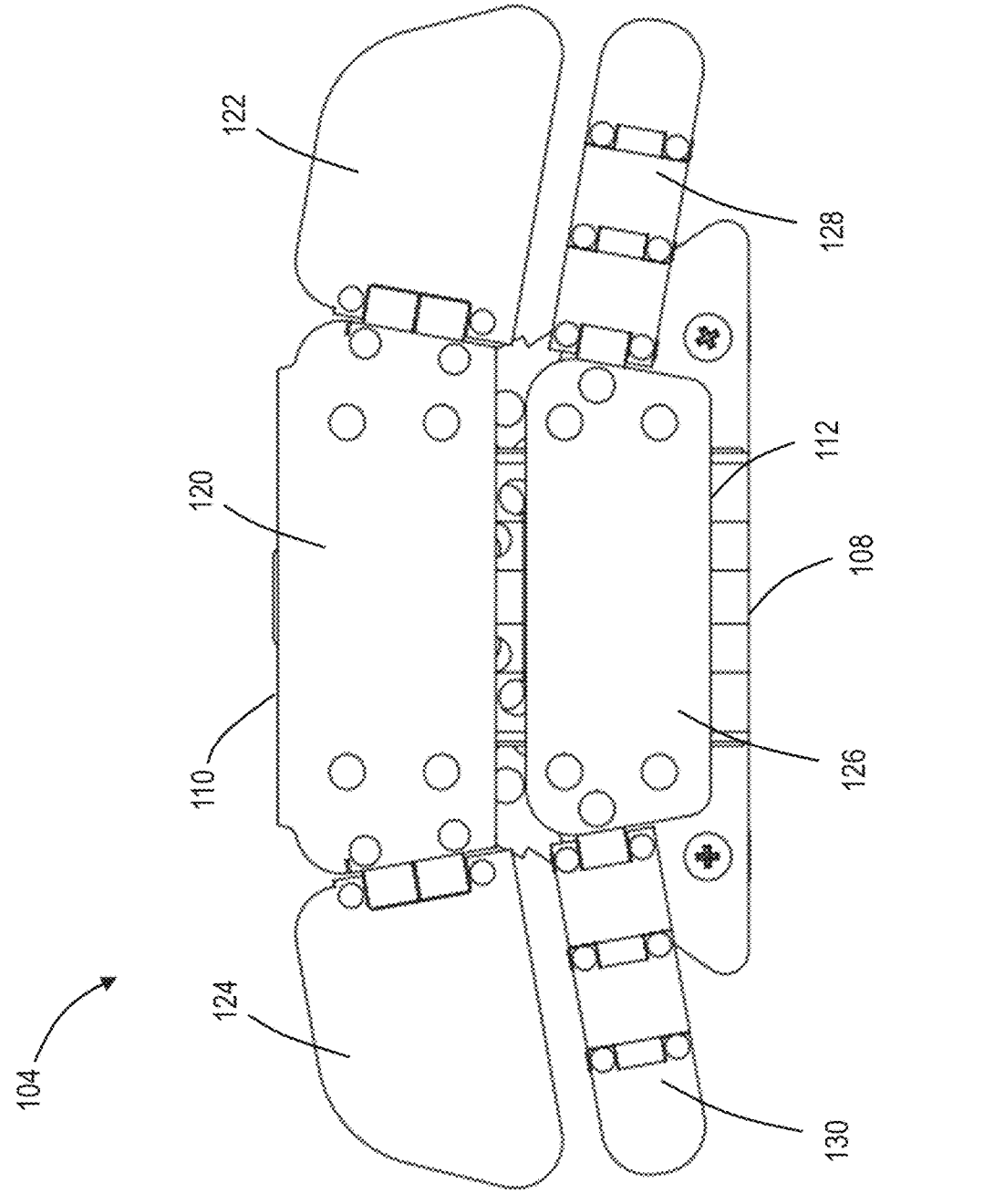
FIG. 4 is a front view of the integrated seat assembly shown with the cushions removed, in accordance with example embodiments of this disclosure.

FIG. 4 illustrates the configuration and positional relationship between the separate headrest subassembly 110 and the neck support subassembly 112, and each of the subassemblies 110, 112 relative to the fixed subassembly 108. The headrest subassembly 110 generally includes a headrest support plate 120 movably attached to the fixed subassembly 108, and a plurality of headrest supports rotatably coupled to the headrest support plate 120. As shown, the headrest support plate 120 is center between a left or first headrest support 122, and a right or second headrest support 124. Each of the left and right headrest supports 122, 124 is configured to rotate, independently, relative to the headrest support plate 120. In use, the left and right headrest supports 122, 124 can be individually and manually articulated forward for side support for the head. Each of the left and right side headrest supports 122, 124 may include additional segments, rotatably or otherwise coupled, for further articulation capability.

The neck support subassembly 112 also generally includes a neck support plate 126 movably attached to the fixed subassembly 108, and a plurality of neck supports rotatably coupled to the neck support plate 126. As shown, the neck support plate 126 is centered between a left side or first neck 128, and a right side or second neck support 130. Each of the left side and right side neck supports 128, 130 is configured to articulate, independently, relative to the neck support plate 126. In use, the left and right side neck supports 128, 130 can be individually and manually articulated forward for lateral support for the neck. In use, any one of the headrest supports 122, 124 and neck supports 128, 130 can be manually articulated to any achievable position desired by the user or passenger.

Figure 5:
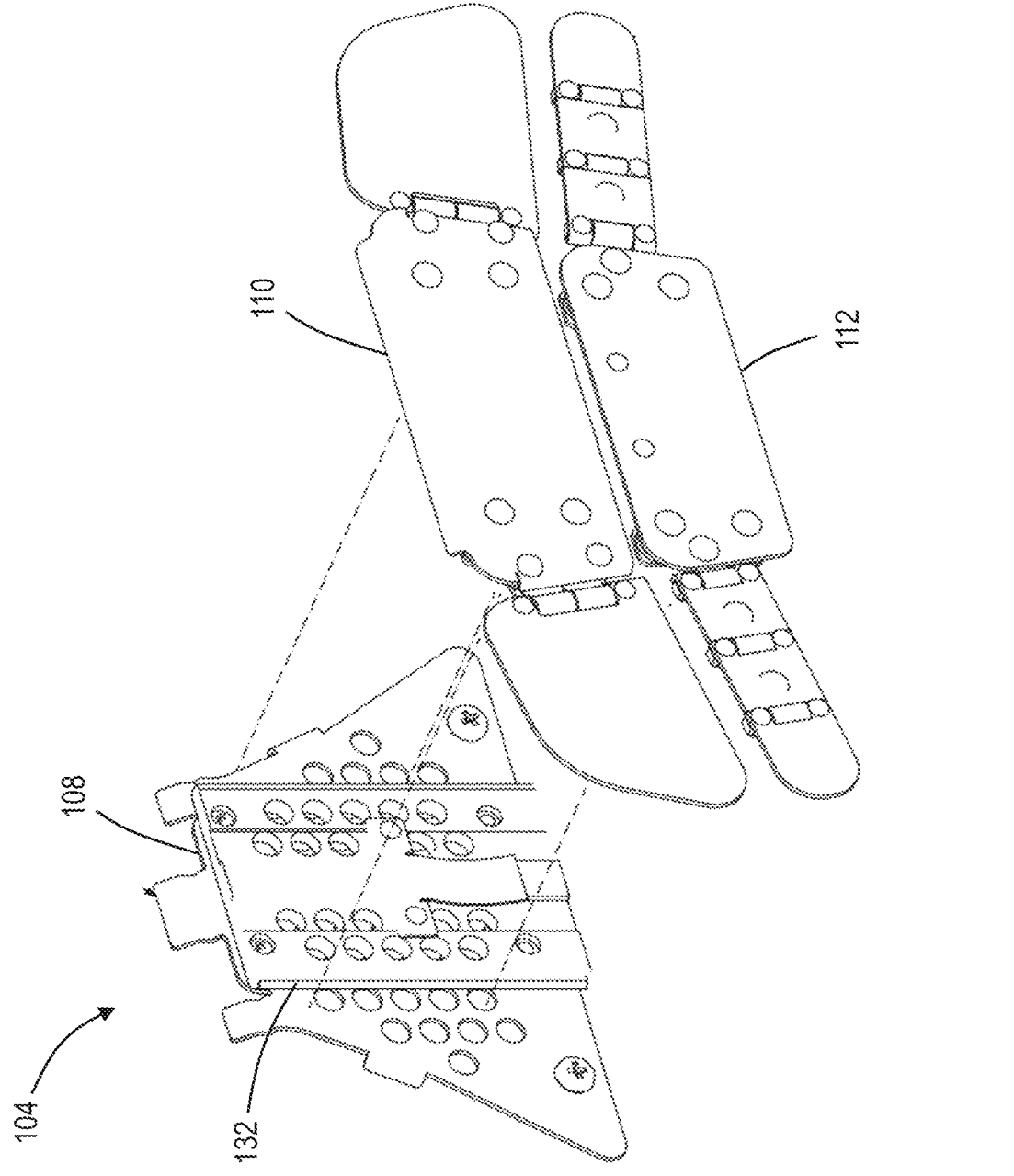
FIG. 5 is an exploded view of the integrated seat assembly shown from the front, in accordance with example embodiments of this disclosure.

FIG. 5 illustrates further details of the fixed subassembly 108 and interface between the fixed subassembly 108 and the headrest and neck support subassemblies 110, 112. As shown, the fixed subassembly 108 includes a rail 132 for guiding vertical translation and the motion path of the subassemblies 110, 112 relative to the fixed subassembly 108 and to each other. Vertical adjustment allows the two subassemblies 110, 112 to be positioned where desired along the height of the backrest and also adjust the spacing between the two subassemblies 110, 112. The length of the rail 132 may be customized depending on the amount of adjustability desired and/or required, and the configuration of the backrest. In embodiments, the rail 132 includes two spaced rails for being positioned between spaced components carried on the subassemblies 110, 112 and configured to interact with the rail.

Figure 6:
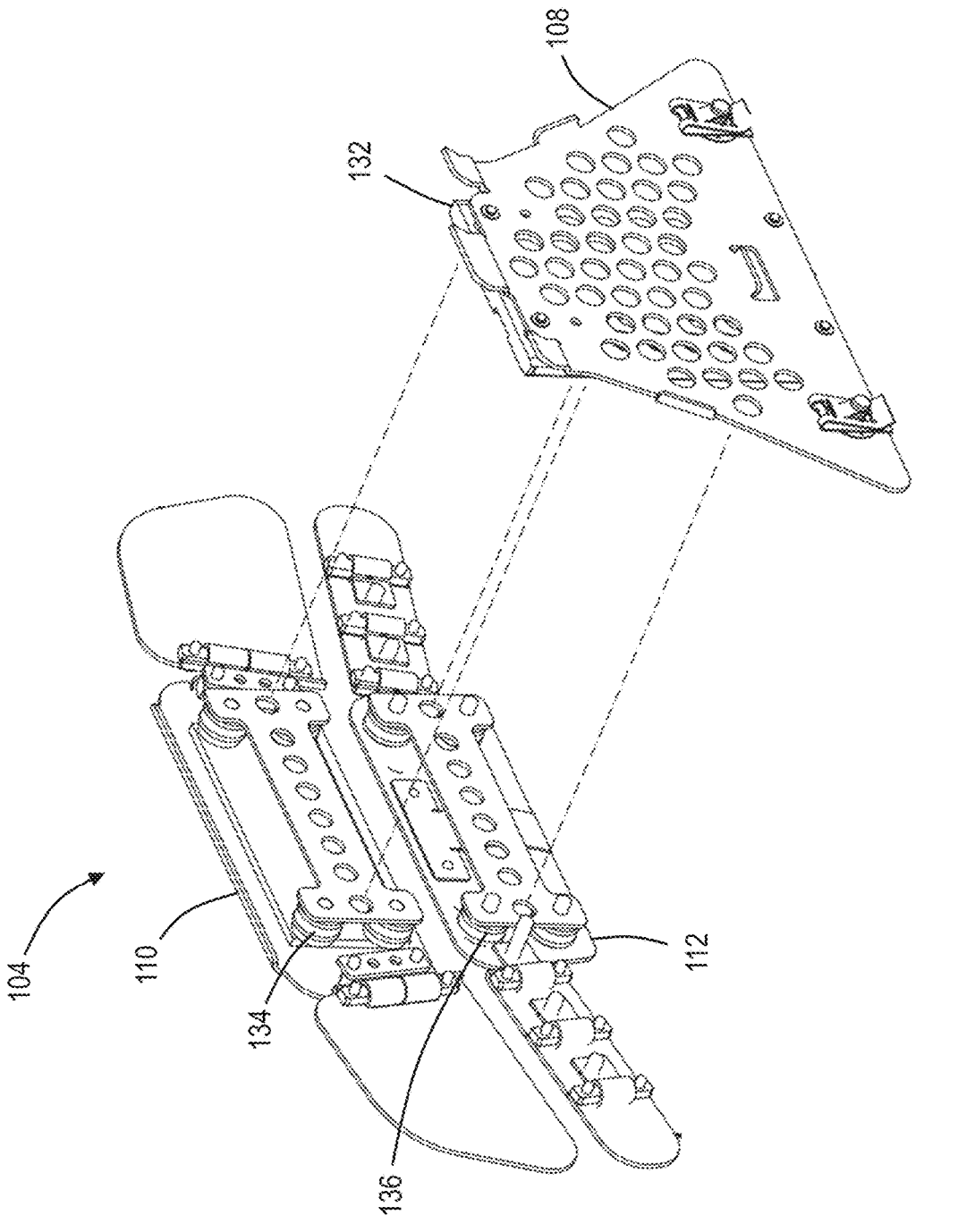
FIG. 6 is an exploded view of the integrated seat assembly shown from the back, in accordance with example embodiments of this disclosure.

FIG. 6 illustrates further details of the headrest and neck support subassemblies 110, 112 for interfacing with the rail 132. In embodiments, the headrest subassembly 110 includes a plurality of vertically-oriented rollers 134 configured to interact with the rail 132 to facilitate smooth vertical translation of the headrest subassembly 110, and the neck support subassembly 112 also includes vertically-oriented rollers 136 configured to also interact with the rail 132. In embodiments, the rollers 134, 136 may be provided in spaced pairs configured to receive the rail 132 therebetween. In use, the rail 132 and rollers 134, 136 interact to control the motion paths of the subassemblies 110, 112.

Figure 7:
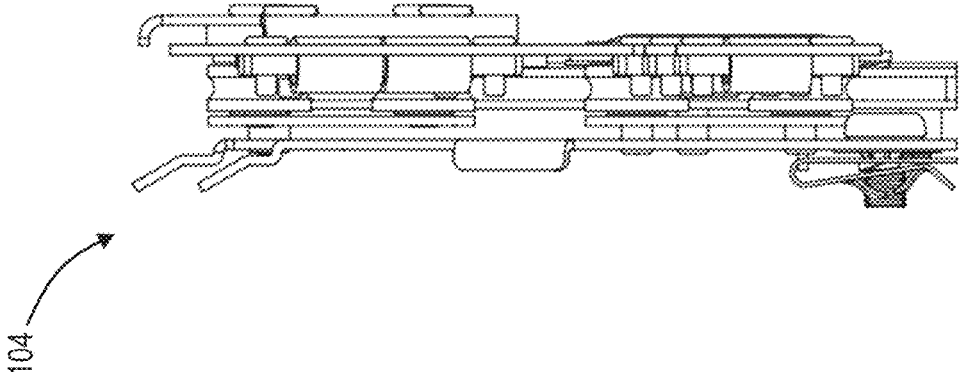
FIG. 7 is a side view of the integrated seat assembly, in accordance with example embodiments of this disclosure.
Figure 8:
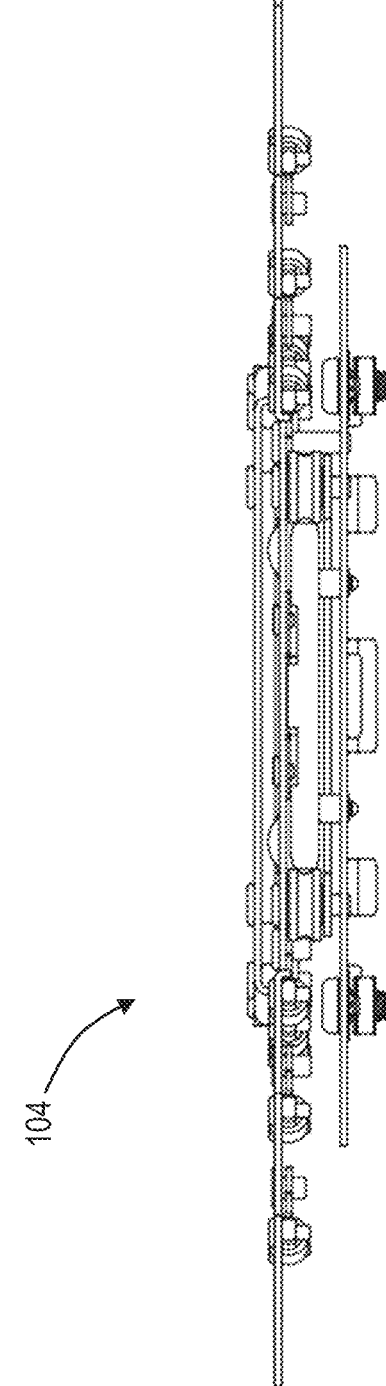
FIG. 8 is a top view of the integrated seat assembly, in accordance with example embodiments of this disclosure.

FIGS. 7 and 8 illustrate respective side and top views of the assembly 104 shown in a fully assembled state and without the cushioning. As apparent from the views, the assembly 108 has a thin profile to be compatible for use with various backrest configurations and while permitting a maximum amount of cushioning to provide a heavily padded assembly 108.

Figure 9:
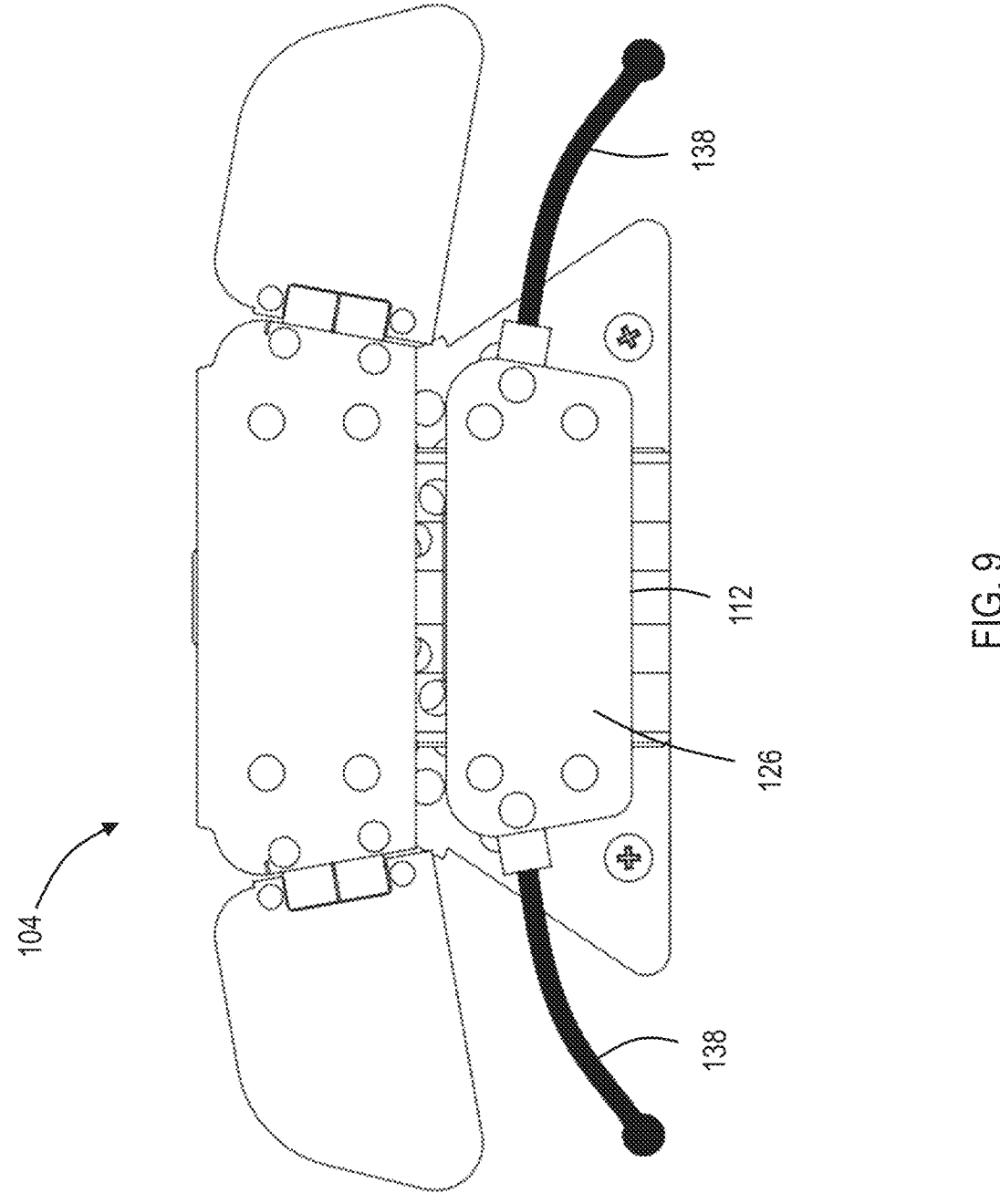
FIG. 9 is a front view of the integrated seat assembly including gooseneck supports associated with the neck support subassembly, in accordance with example embodiments of this disclosure.

FIG. 9 illustrates a further embodiment of the assembly 104 wherein the neck support subassembly 112 includes the neck support plate 126 and left and right gooseneck arms 138 known to those in the art for providing full adjustability in all directions. In embodiments, this configuration provides additional adjustment capabilities as compared to the rotatably coupled supports described above, as well as the ability of the flexible gooseneck to hold its shape.

Figures 10A, 10B, 10C:
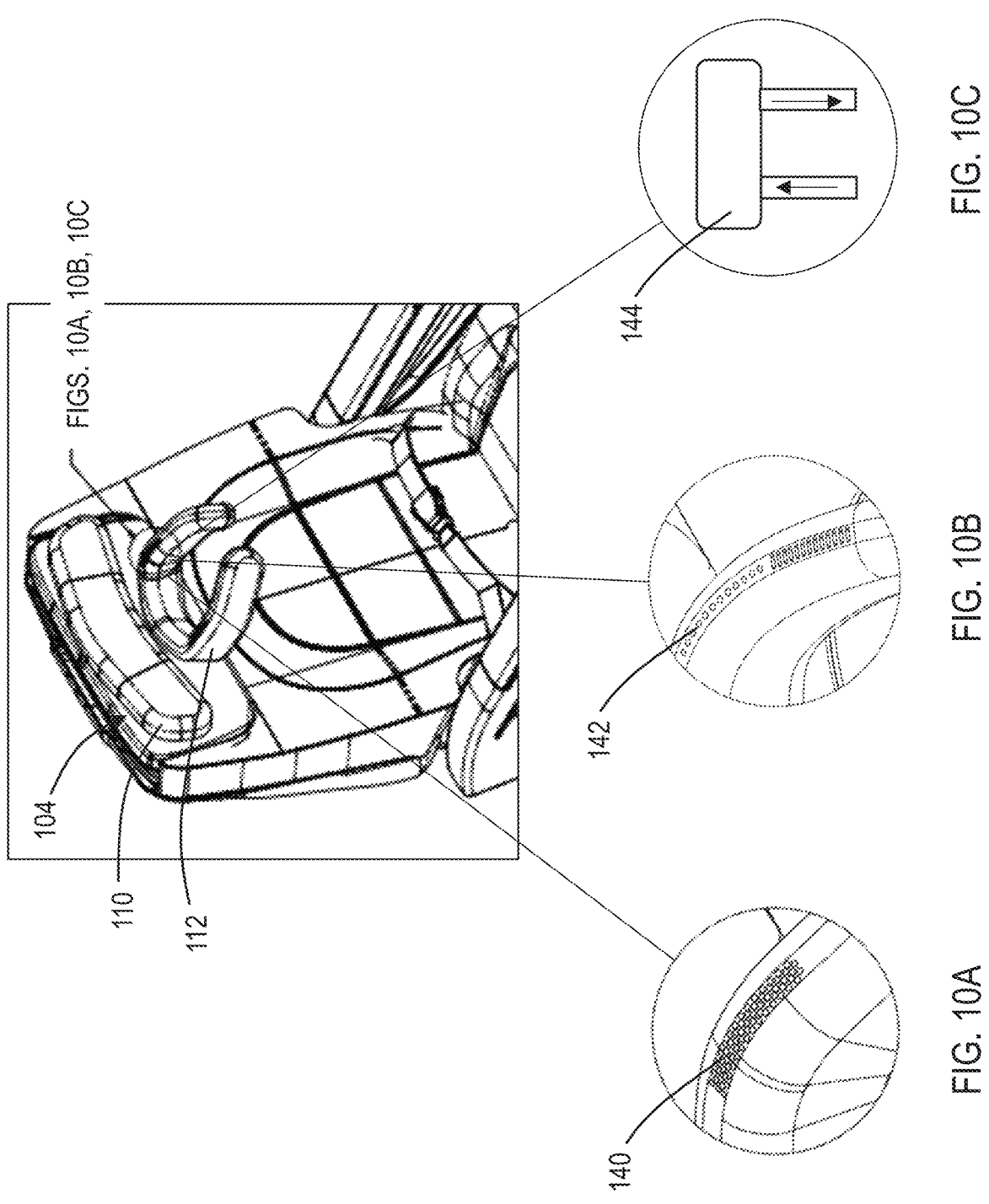
FIGS. 10A, 10B and 10C are detailed views of optional features of the integrated seat assembly, in accordance with example embodiments of this disclosure.

FIGS. 10A, 10B, and 10C illustrate the integrated assembly 104 installed on a premium class passenger seat and with optional features. In further embodiments, at least one of the headrest subassembly 110 and the neck support subassembly 112 may serve to locate additional seat features, for instance at least one speaker 140 as shown in FIG. 10A, air vents 142 as shown in FIG. 10B, an inflatable bladder 144 as shown in FIG. 10C, massagers, heaters, fans, etc. In some embodiments, at least one of electrical connections and fluid passageways may be routed through the subassemblies 110, 112. In the case of fluid passageways, such passageways may open to direct flowing air, conditioned or unconditioned, toward the user to provide a cooling and or heating effect commensurate with luxuries expected in a premium class seat.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A headrest assembly for mounting to a passenger seat, comprising:

a support plate for mounting to the passenger seat;

a rail mounted to the support plate;

a headrest subassembly including a headrest support plate translatably mounted to the rail, a left headrest support rotatably mounted to the headrest support plate, and a right headrest support rotatably mounted to the headrest support plate; and a neck support subassembly including a neck support plate translatably mounted to the rail, a left neck support mounted to the neck support plate, and a right neck support mounted to the neck support plate;

wherein the headrest subassembly and the neck support subassembly are independently translatable along the rail.

2. The headrest assembly according to claim 1, wherein each of the left neck support and the right neck support comprise a plurality of rotatably connected individual segments.

3. The headrest assembly according to claim 1, wherein each of the left neck support and the right neck support are fully articulating gooseneck supports.

4. The headrest assembly according to claim 1, wherein each of the left headrest support, the right headrest support, the left neck support, and the right neck support are configured to deploy, independently, in a forward direction away from the support plate.

5. The headrest assembly according to claim 1, wherein each of the headrest support plate, the left headrest support, the right headrest support, the neck support plate, the left neck support, and the right neck support carries a cushion.

6. The headrest assembly according to claim 1, wherein:

each of the headrest subassembly and the neck support subassembly further comprises a cushion;

the cushion of the headrest subassembly is continuous across the left headrest support, the headrest support plate, and the right headrest support; and the cushion of the neck support subassembly is continuous across the left neck support, the neck support plate, and the right neck support.

7. The headrest assembly according to claim 1, wherein the headrest subassembly and the rail interface through a first set of rollers, and the neck support subassembly and the rail interface through a second set of rollers.

8. The headrest assembly according to claim 1, wherein at least one of the headrest subassembly and the neck support subassembly further comprises an internal speaker.

9. The headrest assembly according to claim 1, wherein at least one of the headrest subassembly and the neck support subassembly further comprises at least one of an internal massager, an internal fan, and an internal heater.

10. An aircraft passenger seat, comprising:

a backrest; and a headrest assembly, comprising:

a support plate mounted to the backrest;

a rail mounted to the support plate;

a headrest subassembly including a headrest support plate translatably mounted to the rail, a left headrest support rotatably mounted to the headrest support plate, and a right headrest support rotatably mounted to the headrest support plate; and a neck support subassembly including a neck support plate translatably mounted to the rail, a left neck support mounted to the neck support plate, and a right neck support mounted to the neck support plate;

wherein the headrest subassembly and the neck support subassembly are independently translatable along the rail.

11. The aircraft passenger seat according to claim 10, wherein each of the left neck support and the right neck support comprise a plurality of rotatably connected individual segments.

12. The aircraft passenger seat according to claim 10, wherein each of the left neck support and the right neck support are fully articulating gooseneck supports.

13. The aircraft passenger seat according to claim 10, wherein each of the left headrest support, the right headrest support, the left neck support, and the right neck support are configured to deploy, independently, in a forward direction away from the support plate.

14. The aircraft passenger seat according to claim 10, wherein:

each of the headrest subassembly and the neck support subassembly further comprises a cushion;

the cushion of the headrest subassembly is continuous across the left headrest support, the headrest support plate, and the right headrest support; and the cushion of the neck support subassembly is continuous across the left neck support, the neck support plate, and the right neck support.

15. The aircraft passenger seat according to claim 10, wherein at least one of the headrest subassembly and the neck support subassembly further comprises at least one of an internal speaker, an internal massager, an internal fan, and an internal heater.

16. The aircraft passenger seat according to claim 10, wherein the headrest subassembly and the fixed subassembly interface through a first set of rollers, and the neck support subassembly and the fixed subassembly interface through a second set of rollers.

17. A headrest assembly for mounting to a passenger seat, comprising:

a support plate mountable to the passenger seat;

a vertical rail mounted to the support plate;

a headrest subassembly translatably mounted to the rail, the headrest subassembly configured to translate vertically along the rail, the headrest subassembly including a headrest support plate, a left headrest support rotatably mounted to the headrest support plate, and a right headrest support rotatably mounted to the headrest support plate; and a neck support subassembly translatably mounted to the rail, the neck support subassembly configured to translate vertically along the rail, the neck support subassembly including a neck support plate, a left neck support mounted to the neck support plate, and a right neck support mounted to the neck support plate;

wherein the headrest subassembly and the neck support subassembly are configured for independent vertical translation along the rail.

18. The headrest assembly according to claim 17, wherein each of the left neck support and the right neck support comprise a plurality of rotatably connected individual segments or articulating gooseneck supports.

* * * * *